United States Patent [19]
Jelich et al.

[11] Patent Number: 5,346,533
[45] Date of Patent: Sep. 13, 1994

[54] METHOD OF MONITORING FILTER COMPONENTS

[75] Inventors: Werner Jelich, Bochum; Heiko Rehwinkel, Bottrop; Friedrich Klauke, Ratingen; Dieter König, Hattingen; Udo Kalthoff, Mülheim/Ruhr, all of Fed. Rep. of Germany

[73] Assignee: Deutsche Babcock Energie- und Umwelttechnik Aktiengesellschaft, Oberhausen, Fed. Rep. of Germany

[21] Appl. No.: 98,595

[22] Filed: Jul. 28, 1993

[30] Foreign Application Priority Data

Aug. 7, 1992 [DE] Fed. Rep. of Germany ....... 4226145

[51] Int. Cl.$^5$ ............................ B01D 35/143
[52] U.S. Cl. ............................ 95/20; 55/270; 55/274; 55/283; 55/288; 55/302; 95/25; 95/280
[58] Field of Search ........... 95/19, 20, 280, 25; 96/113; 55/270, 274, 283, 288, 302, 523

[56] References Cited

U.S. PATENT DOCUMENTS

| | | | |
|---|---|---|---|
| 4,500,926 | 2/1985 | Yoshimaru | 358/431 |
| 4,726,820 | 2/1988 | Stanelle | 95/20 |
| 4,865,627 | 9/1989 | Dewitz et al. | 95/20 X |
| 4,885,014 | 12/1989 | Reinhardt et al. | 55/523 X |
| 5,059,227 | 10/1991 | Kilicaslan et al. | 55/523 X |
| 5,094,673 | 3/1992 | Kilicaslan et al. | 55/302 |
| 5,094,675 | 3/1992 | Pitt et al. | 55/302 X |
| 5,205,156 | 4/1993 | Asano et al. | 55/274 X |

FOREIGN PATENT DOCUMENTS

| | | | |
|---|---|---|---|
| 2606146 | 8/1977 | Fed. Rep. of Germany | 95/20 |
| 3-229607 | 10/1991 | Japan | 95/20 |

Primary Examiner—Richard L. Chiesa
Attorney, Agent, or Firm—Max Fogiel

[57] ABSTRACT

A method of monitoring filter components. The components are hollow and employed for filtering hot and dusty gases. They are accommodated in groups in a housing. Each group communicates through a single supply line with a filtered-gas line. The filtered-gas line conveys the filtered gas away. A sweeper is injected in the form of a gas into each supply line in cycles at higher pressure. The sweeping cycle is recorded. Measurement is carried out in the flow of sweeper and/or of filtered gas. The result of the measurement is compared with the record and an alarm released in the event of a discrepancy.

8 Claims, 2 Drawing Sheets

METHOD OF MONITORING FILTER COMPONENTS

BACKGROUND OF THE INVENTION

The present invention concerns a method of monitoring filter components. The components are hollow and employed for filtering hot and dusty gases.

A hot-gas filter with tubes suspended from a perforated slab that divides the housing into an unfiltered-gas section and a filtered-gas section is known from German Patent 3 515 365. Unfiltered gas gets into the filtered gas when one of the tubes in this filter breaks and malfunctions. The whole filter has to be taken out of operation and the defective tube replaced to prevent too much dust and contaminants from getting into the filtered gas. The result is unnecessarily interrupted production.

The tubes in the filter housing disclosed in German OS 3 938 264, which is equivalent to European 0 433 637, are assigned group-by-group or row-by-row to individual headers that convey the filtered gas away. The ceramic tubes rest on or are positioned under the headers. The headers are distributed over the cross-section of the housing on one or more levels. The headers communicate with filtered-gas lines inside or outside the housing. There is also no way to handle the malfunctions that occur when one of these tubes breaks.

The ceramic tubes can be swept inside the housing of hot-gas filter known from German OS 3 938 264 (European 0 433 637) by injecting countercurrent bursts of a gas into the filtered-gas line. Measuring the pressure of the unfiltered gas and of the filtered gas to determine the difference is also known in this context (from U.S. Pat. No. 4,500,926). If the difference exceeds a prescribed threshold, a signal to sweep a specific group of filter components is emitted. The supply of unfiltered gas to that group is discontinued while it is being swept. The rate of flow of filtered gas through the header is measured and added to the difference that triggers the sweeping in another known approach (WIPO 88/07404). Even these techniques, however, reveal nothing about the state of a particular group of filter components in that the pressure and flow of the filtered gas is more or less determined from the gas leaving the housing.

SUMMARY OF THE INVENTION

The object of the present invention is an improvement in the generic device that will specify what particular tube has been damaged and accordingly keep unfiltered gas out of the filtered gas.

The point of departure for the invention is that such changes at the filtered-gas end as a brief change in pressure or dust density can mean that some of the filter components are being swept. The invention exploits this situation by associating a change at the filtered-gas end with the component-sweeping cycle. If which group of filter components has just been swept is known, the detected change can be assigned to that group and will provide information about the state of the group's filter components. Such a procedure is of particular advantage when direct detection inside a line that communicates with the group is impossible because of heat or lack of access.

BRIEF DESCRIPTION OF THE DRAWINGS

Several embodiments of the invention will now be specified with reference to the accompanying drawing, wherein.

DESCRIPTION OF THE PREFERRED EMBODIMENTS

Figure 1:
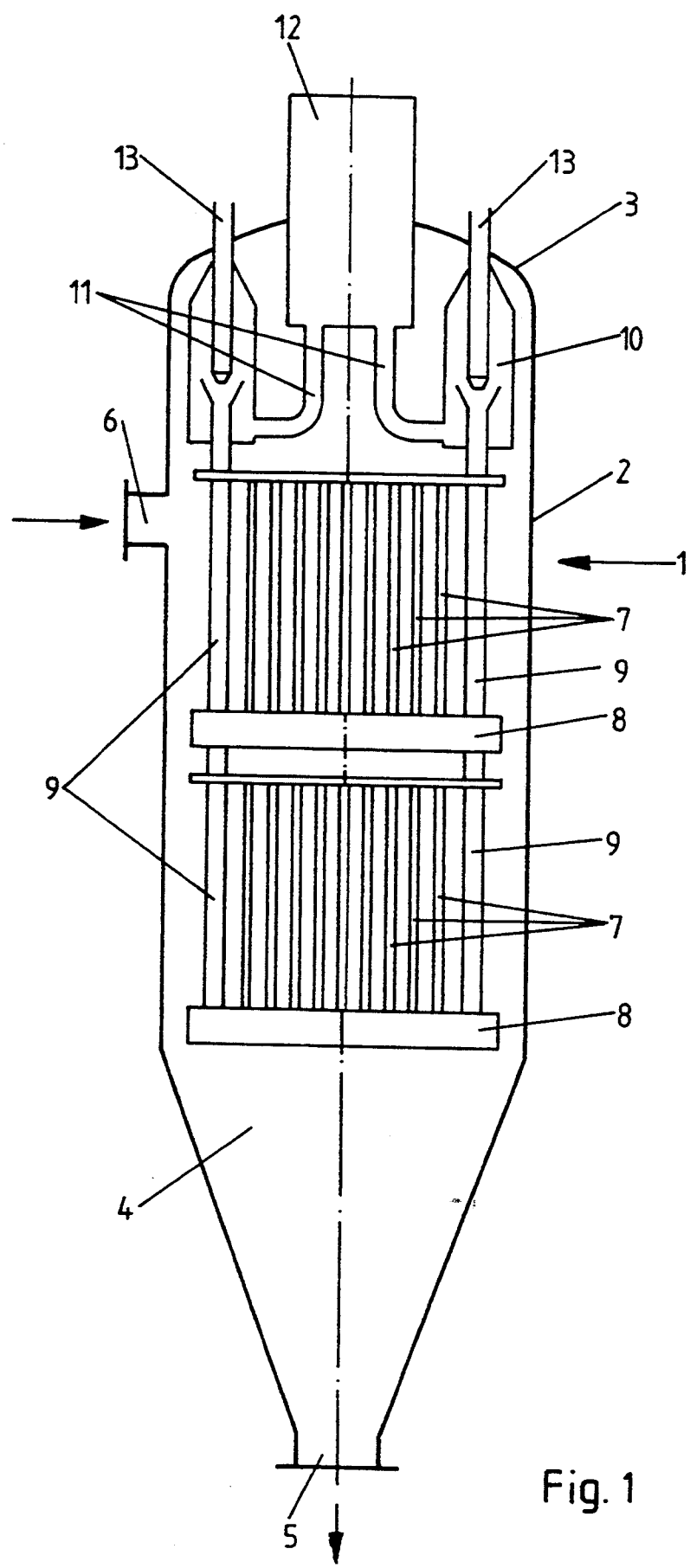
FIG. 1 is a manufacture longitudinal section through a device for filtering gases and FIG. 2 is a monitoring flow chart.
Figure 2:
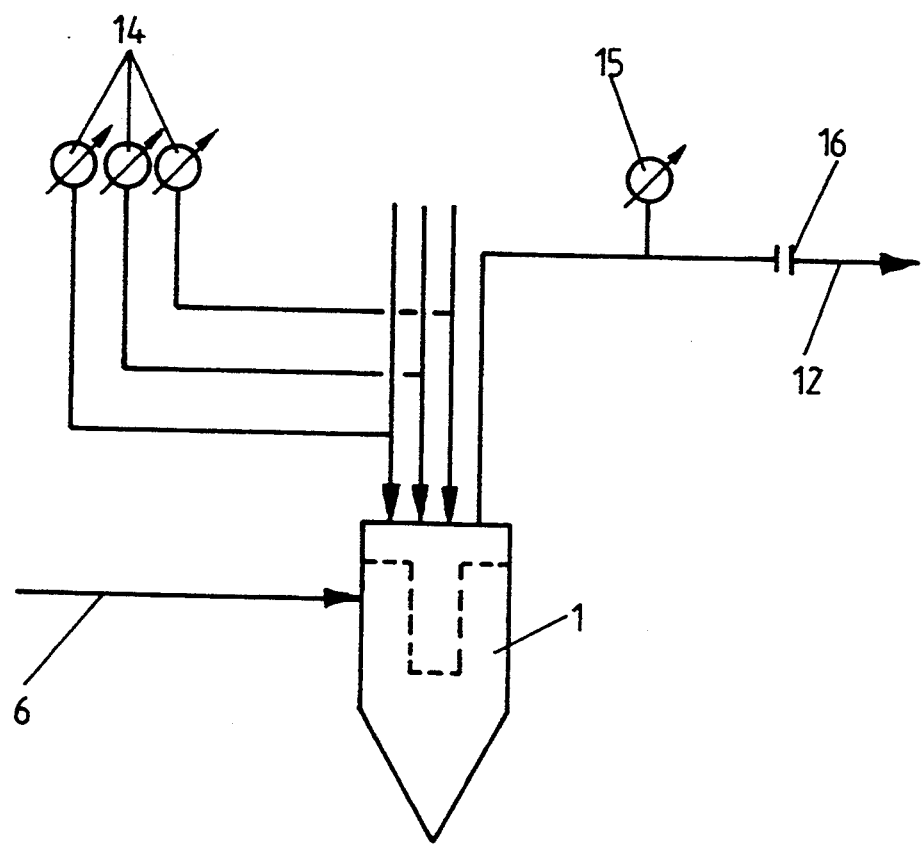

A device for filtering preferably hot and dusty compressed gases consists of a housing 1 with a cylindrical wall 2, a domed top 3, and a funnel-shaped bottom 4. The precipitated dust collects at the bottom, which tapers down to an outlet 5. Housing 1 also has an intake 6 for the dusty gas.

Housing 1 accommodates hollow filter components. Several components communicate with a single header 8. Header 8 collects the filtered gas and conveys it away. The components can be either hose sections or ceramic tubes 7 closed off at one end. Every header 8 accepts gas from a group of tubes 7 that either rest on it on appropriate connections or are suspended from it. Headers 8 are positioned adjacent on one or more levels. The headers can for example rest on a ring secured to the wall 2 of housing 1 or be suspended in the housing above tubes 7.

Each header 8 communicates with a supply line 9. Each supply line 9 communicates with a collector 10. One or more collectors 10 are accommodated inside housing 1 and communicate by way of branches 11 with a filtered-gas line 12 that extends through the top 3 of housing 1.

Coaxial with each supply line 9 is a filter-component sweeping lance 13. Lance 13 extends into collector 10 through the top 3 of housing 1 and terminates above the mouth of supply line 9. A gas can be injected into header 8 through lance 13 at a prescribed pressure above that of the dusty gas. The gas flows into filter tubes 7 and sweeps the filter cake off their outer surface.

Filter tubes 7 are swept at intervals in accordance with a prescribed cycle, with each group of tubes being swept once per cycle. A brief change in pressure indicates that a group is being swept. The change can be detected by a pressure sensor 14 in lance 13. When a filter tube 7 is obstructed the pressure pulse will exceed a standard threshold- A broken tube on the other hand will generate pressure below normal. Any change in the pulse is accordingly an indication of a defective filter group. Depending on the sweeping cycle accordingly, the defective group can be identified and an alarm released.

When damage is indicated, the defective group can be removed from the sweeping procedure to prevent the fracture in the tube from being uncovered and allowing dust to penetrate to the filtered-gas side- Once a tube has been excluded from the sweeping procedure, the fracture will seal itself with dust and decontamination will be initiated, augmented by the counterweight resting on the tube.

Damage can alternatively be revealed by other parameters relating to the state of the filtered gas and associated as hereintofore specified with the sweeping cycle instead of by a pulse of pressure. Such parameters include the pressure, the dust content, and the dynamic pressure of the filtered gas. The density of the dust is detected by a sensor 16. Pressure is detected by a sensor 15. Sensors 15 and 16 are accommodated in filtered-gas line 12. Dynamic pressure is measured by a pressure transducer 14 in sweeping lances 13.

All that is necessary to monitor the groups of filter tubes is to detect the sweeping cycle and compare it with either the pressure pulse, the dust density, or the dynamic pressure. If additional confirmation is necessary, the pressure pulse, dust density, and dynamic pressure can be determined. The appropriate instruments are interconnected through a switching circuit, the signals from which are compared with the sweeping cycle.

We claim:

1. A method for monitoring hollow filter elements used for filtering hot and dusty gases, comprising the steps of: arranging said filter elements in groups in a filter housing; connecting each group through a single supply line with a filtered-gas line; conveying filtered gas away through said filtered gas line; injecting a filtering sweeping medium with flow in form of a gas into each supply line in cycles at higher pressure; registering a filtering cycle; recording and measuring at least one of sweeper flow and filtered gas flow; comparing a result of said measuring step with a registration of a sweeping cycle; and releasing an alarm when a difference results from said comparing step, whereby a defective filter element can be isolated and penetration of unfiltered gas into the filtered gas is prevented, each sweeping cycle being related to a change at a filtered gas side, a group having a defective filter element being excluded from sweeping and a fracture in the defective filter element becoming sealed with dust and decontamination being initiated.

2. A method as defined in claim 1, including the steps of generating individual sweeping pulses in each sweeping lance during a sweeping cycle; recording a maximum value of said individual sweeping pulses; comparing said maximum value with a standard; and releasing said alarm for a respective group of filter elements when a difference results from said comparing step.

3. A method as defined in claim 1, including the steps of measuring dust density and a pressure pulse of the filtered gas in relation to the sweeping cycle; designating said measuring step to a group of filter elements that was swept; and releasing said alarm for a related group of filter elements when a difference results from said comparing step.

4. A method as defined in claim 1, including the steps of measuring dust density of the filtered gas in relation to the sweeping cycle; designating said measuring step to a group of filter elements that was swept; and releasing said alarm for a related group of filter elements when a difference results from said comparing step.

5. A method as defined in claim 1, including the steps of measuring a pressure pulse of the filtered gas in relation to the sweeping cycle; designating said measuring step to a group of filter elements that was swept; and releasing said alarm for a related group of filter elements when a difference results from said comparing step.

6. A method as defined in claim 1, including the step of withdrawing a particular group of filter elements from sweeping when a difference results from said comparing step.

7. A method as defined in claim 1, including the steps of recording and comparing sweeping pulses, dust density, and a pressure pulse, through switching means, with a recording of a sweeping cycle.

8. A method for monitoring hollow filter elements used for filtering hot and dusty gases, comprising the steps of: arranging said filter elements in groups in a filter housing; connecting each group through a single supply line with a filtered-gas line; conveying filtered gas away through said filtered gas line; injecting a filtering sweeping medium with flow in form of a gas into each supply line in cycles at higher pressure; registering a filtering cycle; recording and measuring at least one of sweeper flow and filtered gas flow; comparing a result of said measuring step with a registration of a sweeping cycle; and releasing an alarm when a difference results from said comparing step, whereby a defective filter element can be isolated and penetration of unfiltered gas into the filtered gas is prevented, each sweeping cycle being related to a change at a filtered gas side, a group having a defective filter element being excluded from sweeping and a fracture in the defective filter element becoming sealed with dust and decontamination being initiated; generating individual sweeping pulses in each sweeping lance during a sweeping cycle; recording a maximum value of said individual sweeping pulses; comparing said maximum value with a standard; releasing said alarm for a respective group of filter elements when a difference results form said comparing step; measuring dust density and a pressure pulse of the filtered gas in relation to the sweeping cycle; designating said measuring step to a group of filter elements that was swept; withdrawing a particular group of filter elements from sweeping; and recording and comparing sweeping pulses, dust density, and a pressure pulse, through switching means, with a recording of a sweeping cycle.

* * * * *